United States Patent [19]
Mazzetti

[11] Patent Number: 5,754,072
[45] Date of Patent: May 19, 1998

[54] PROGRAMMABLE CIRCUITRY FOR THE GENERATION OF PRECISION LOW NOISE CLOCK AND BIAS SIGNALS

[75] Inventor: Michael J. Mazzetti, Goleta, Calif.

[73] Assignee: Santa Barbara Research Center, Goleta, Calif.

[21] Appl. No.: 486,495

[22] Filed: Jun. 7, 1995

[51] Int. Cl.⁶ .................................................. G05F 1/04
[52] U.S. Cl. ........................... 327/291; 327/132; 327/170
[58] Field of Search .................................. 327/291, 134, 327/131, 132, 137, 170, 530, 531, 538, 112

[56] References Cited

U.S. PATENT DOCUMENTS 5,469,094 11/1995 Nessi ........................................ 327/110
5,469,096 11/1995 Nessi et al. ................................ 327/112

*Primary Examiner*—Timothy P. Callahan
*Assistant Examiner*—Jung Ho Kim
*Attorney, Agent, or Firm*—W. C. Schubert; W. K. Denson-Low

[57] ABSTRACT

A Clock and Bias Module (CBM 10) includes a low pass filter speed-up switch (U104, U114) to provide both a long time constant and fast settling; bootstrapped power supplies (VR101–104) to provide a wide, programmable output voltage range with overload protection; an integrating output driver (20) to provide controlled clock slew rates while maintaining a precision rail voltage; an active current steering bridge (Q5, Q6, CR1, CR2) to allow computer programmable control of slew rates; a current measurement circuit (U14, U15, U19) that enables sensing an average load current in the presence of large voltage swings; and a compact modular implementation that allows for close proximity of the circuitry to a unit under test. The CBM provides IR Detector FPA electrical stimulus in an automated testing environment. The clock generation circuitry is fully programmable for rail voltage, rising slew rate, and falling slew rate. Actual rail voltages, load currents, and the internal operating temperature may be measured and read by the host computer. The clock switching circuit provides controlled slew rates over a wide range (e.g., from 5 to 500 V/μs) without compromising the DC accuracy and stability of the clock rails. Voltage swings may be programmed from, by example, 0 to 30 volts within a ±15 volt range. Outputs may be shorted to ground, to each other, or to a voltage of up to ±16 volts without damage. A presently preferred embodiment provides four clock channels or eight bias channels per CBM.

19 Claims, 9 Drawing Sheets

PROGRAMMABLE CIRCUITRY FOR THE GENERATION OF PRECISION LOW NOISE CLOCK AND BIAS SIGNALS

FIELD OF THE INVENTION

This invention relates generally to support circuitry for arrays of radiation detectors and, in particular, to circuitry for generating bias potentials and clocking signals.

BACKGROUND OF THE INVENTION

The design, characterization and testing of arrays of radiation detectors, such as a focal plane array (FPA) comprised of infrared radiation (IR) responsive photodetectors, requires the generation of bias potentials and clocking signals. The bias potentials and clocking signals should be highly accurate and, preferably, should be programmable over a wide range of values. Furthermore, a number of parameters should be programmable, including the slew rate of clocking signals and the voltage range of the bias supply (s). Also, the circuitry should output low noise and should be very stabile over time.

One prior technique that is known to the inventor includes the use of fixed or manually adjusted voltage bias supplies and clock switching circuits. These supplies and circuits are generally compact, but are not suitable for the automated testing FPAs. The accuracy of these circuits also may not be suitable for FPA development work.

Another technique that is known to the inventor makes use of racks of commercially available or custom designed equipment. However, such equipment often does not meet stringent noise and stability requirements. Furthermore, rack mounted equipment often introduces ground loops, requires long runs of cabling, and may conduct interference into a unit under test.

SUMMARY OF THE INVENTION

It is thus an object of this invention to provide an accurate and programmable source of bias voltages and clock signals that is suitable for use in developing, characterizing and testing radiation detectors.

It is a further object of this invention to provide a highly programmable and accurate source of bias potentials and clocking signals for use in developing, characterizing and testing radiation detectors.

The foregoing and other problems are overcome and the objects of the invention are realized by programmable bias potential and clock generator circuitry that is constructed in accordance with this invention.

The circuitry, referred to herein as a Clock and Bias Module (CBM), includes a low pass filter speed-up switch to provide both a long time constant and fast settling; bootstrapped power supplies to provide a wide, programmable output voltage range with unique overload protection; an integrating output driver to provide controlled clock slew rates while maintaining a precise rail voltage; an active current steering bridge to allow computer programmable control of slew rates; a current measurement technique that enables sensing an average load current in the presence of large voltage swings; and a compact modular implementation that allows for close proximity of the circuitry to a unit under test.

The CBM provides IR Detector FPA electrical stimulus in an automated testing environment. The clock generation circuitry is fully programmable for rail voltage, rising slew rate, and falling slew rate. The actual rail voltages, load currents, and the internal operating temperature may be measured and read by the host computer.

A clock switching circuit provides controlled slew rates over a wide range (e.g., from 5 to 500 V/μs) without compromising the DC accuracy and stability of the clock rails. The wide range of programmability of the clock slew rate enables the slew rate to be optimized to reduce EMI generation and ringing effects, while driving a variety of load capacitances. Voltage swings may be programmed from, by example, 0 to 30 volts within a ±15 volt range. Outputs may be shorted to ground, to each other, or to a voltage of up to ±16 volts without damage. A presently preferred embodiment provides four clock channels or eight bias channels per CBM.

Computer control of all circuitry is accomplished, preferably, through the use of an on-board (local) microprocessor and a serial link to a host computer through an optical fiber. The on-board microprocessor sets circuit configurations as desired and is then shut down (put to sleep) in order to terminate all digital activity and related noise.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 2A:
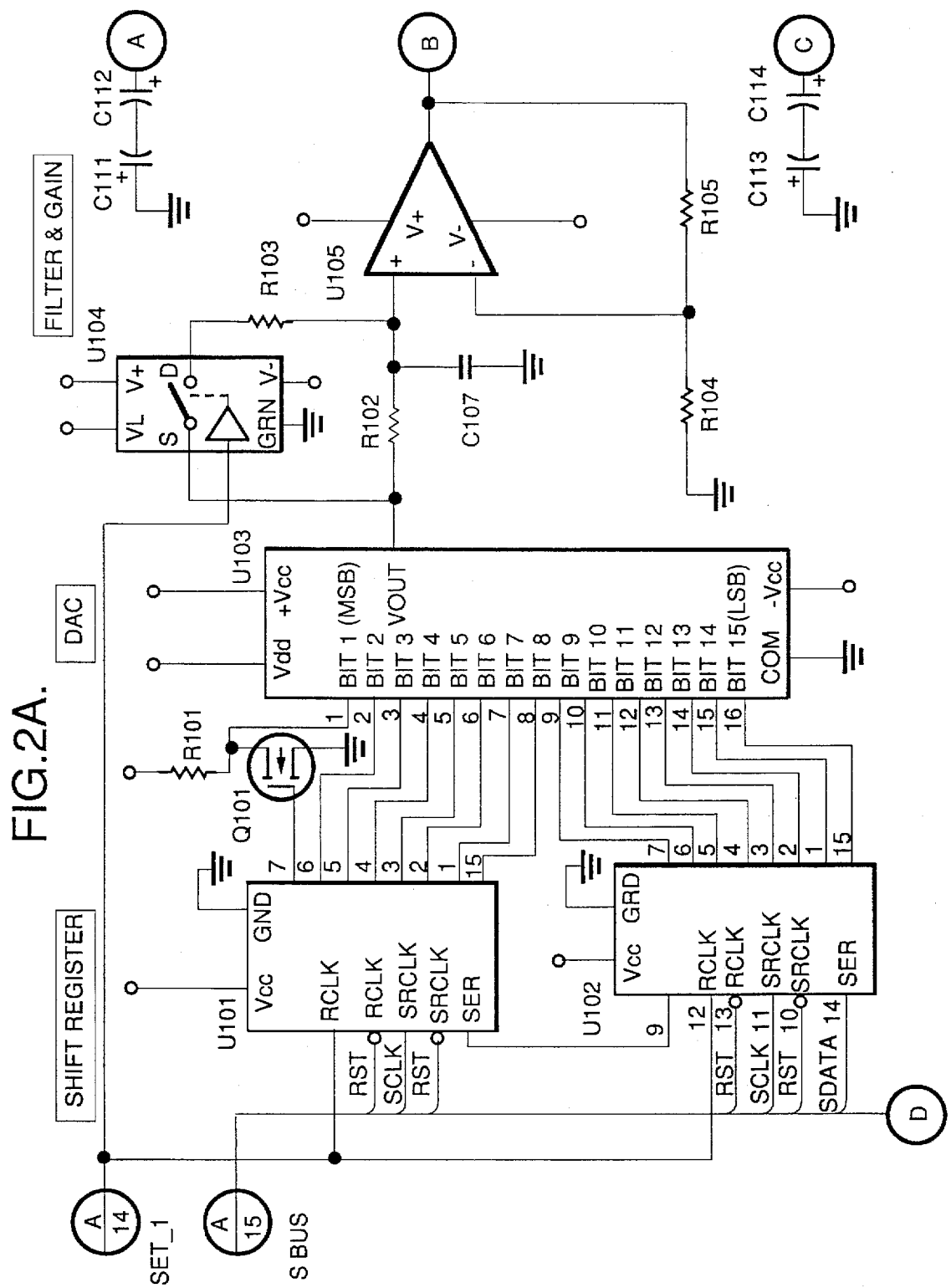
FIGS. 2A–2D, 3 and 4 are schematic diagrams of a presently preferred embodiment of the CBM.
Figure 2B:
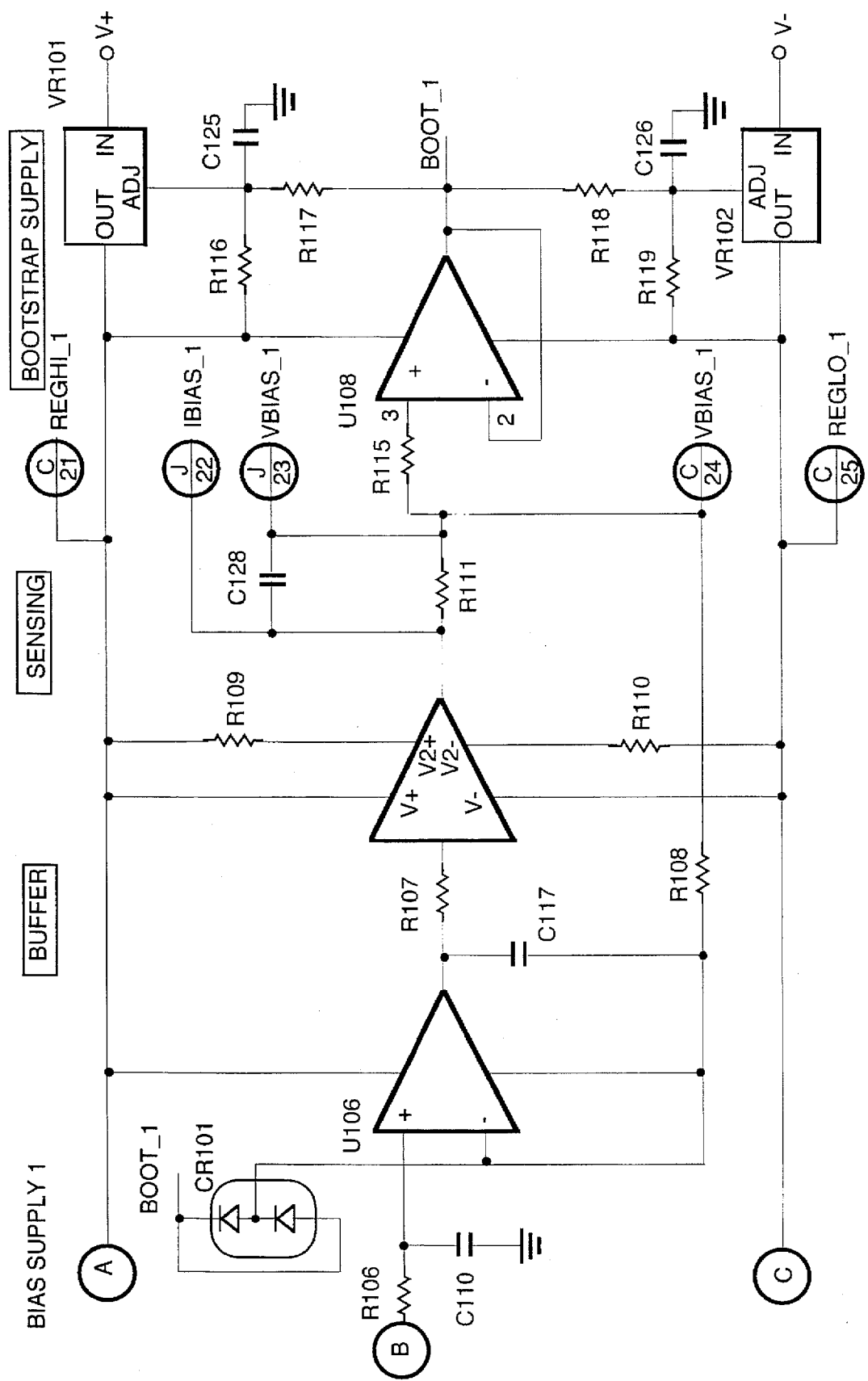
Figure 2C:
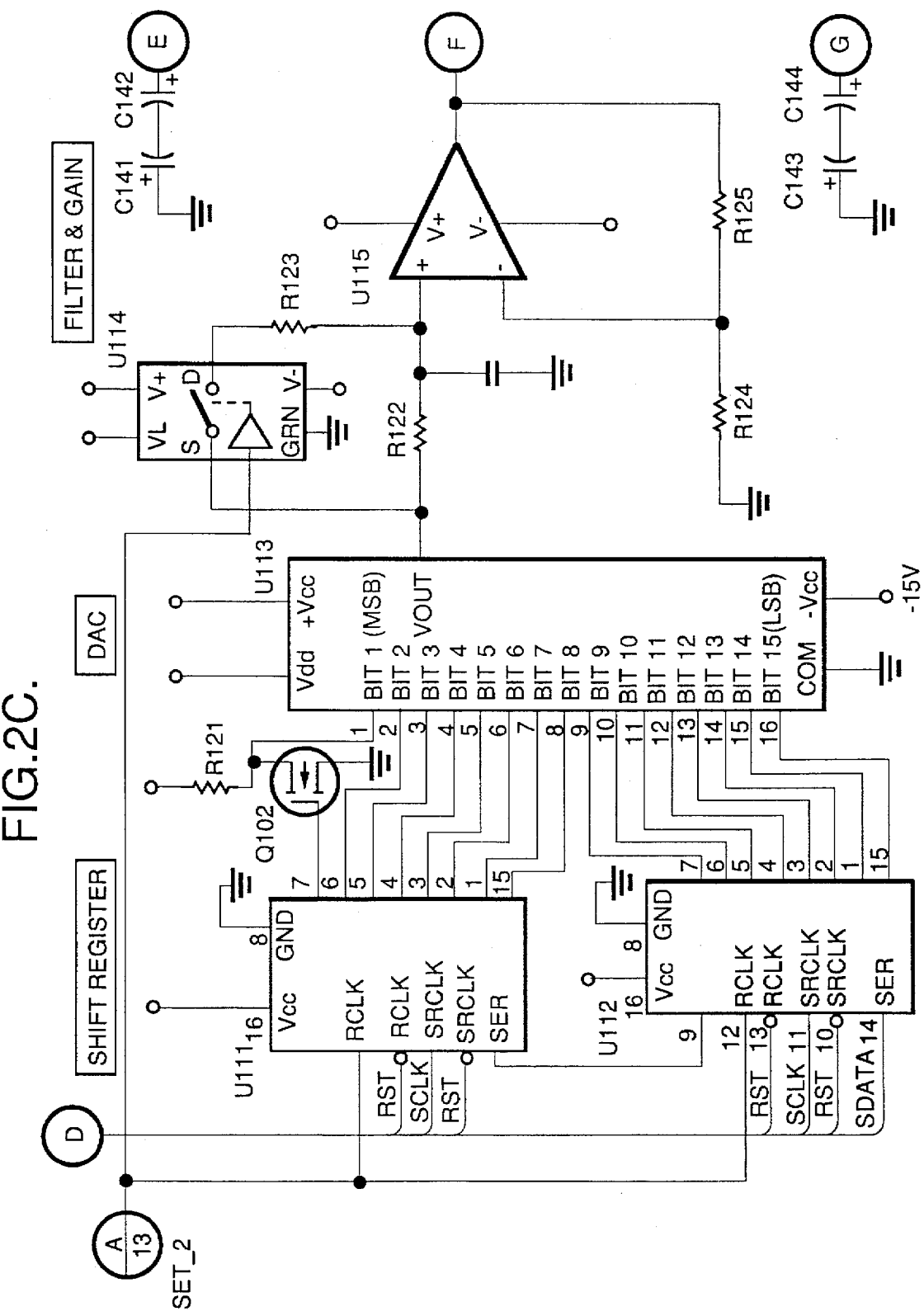
Figure 2D:
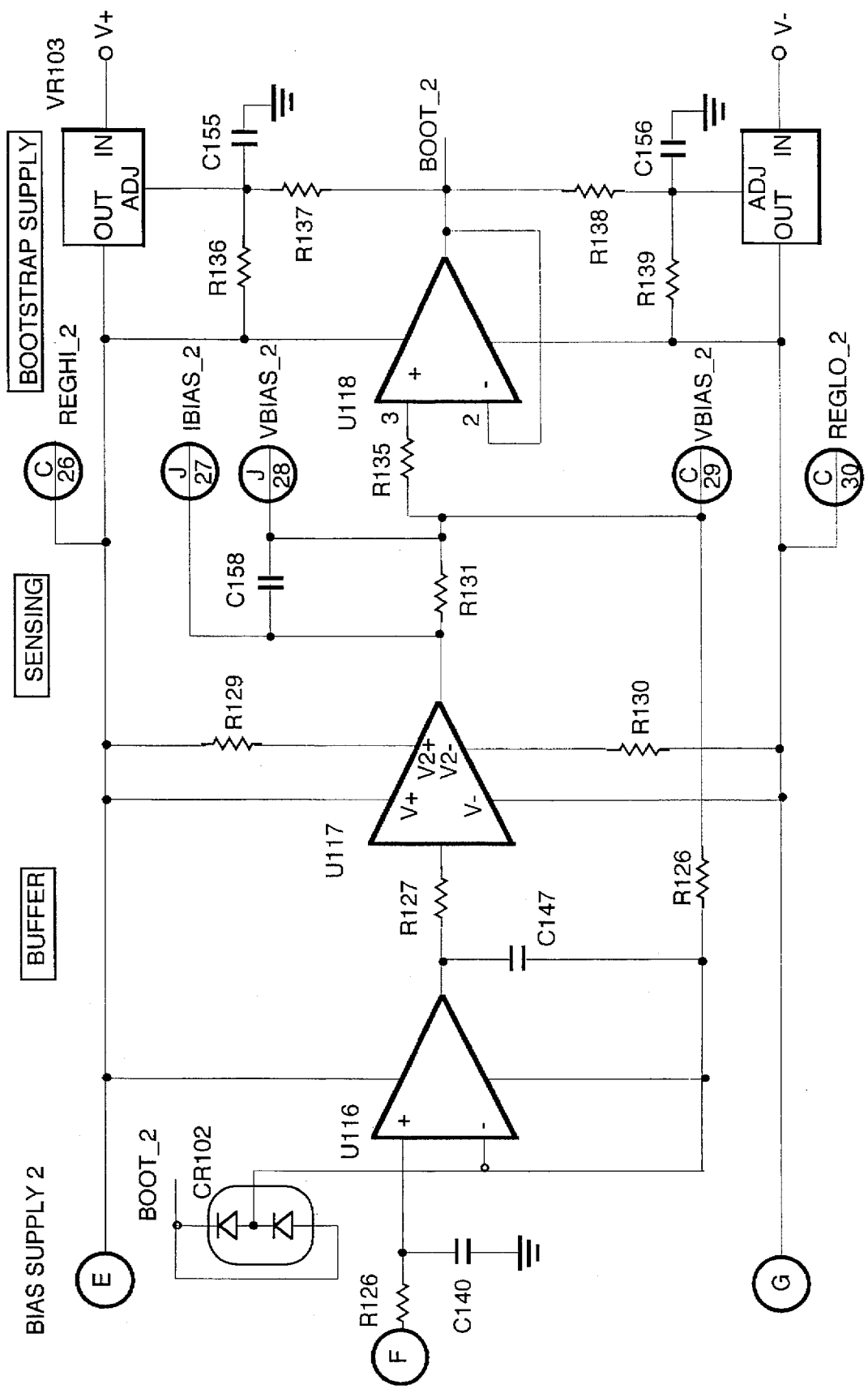

Reference is now made to FIGS. 1, 2A–2D, 3 and 4 in conjunction with the following description of the CBM 10. It will be realized that FIGS. 2A and 2B are similar to FIGS. 2C and 2D, and that the description of the circuitry of FIGS. 2A and 2B applies as well to the circuitry of FIGS. 2C and 2D.

The ensuing description of the invention is divided into a number of sections for highlighting the novel circuit construction of the CBM 10.

1. LOW PASS FILTER SPEED-UP SWITCH

An RC circuit comprised of R102 and C107 shown in FIG. 2A forms a single-pole low-pass filter. This filter reduces the Digital to Analog Converter (DAC) noise of a 16-bit converter U103 by a factor of 20 at 1Hz. The RC circuit has a time constant of 3.3 seconds and requires 16 seconds for a step change to within 99% of final value. By momentarily closing the solid state switch U104, this settling time is reduced to 16 ms by placing R103 in parallel with R102. A feature of this circuit is that no additional microprocessor lines are required. Instead the switch control of U104 is connected to a data latch line SET_1 that also feeds shift registers U101 and U102. The outputs of U101 and U102 form the digital inputs for the DAC U103. As such, whenever a new DAC setting is latched into the shift registers U101 and U102 the speed-up switch U104 is automatically closed. Firmware executed by the on-board microprocessor 12 (FIG. 6) then holds the SET_1 line high for a predetermined time to rapidly settle the output voltage of DAC 103.

Shift register 102 receives a serial data input (SDATA) from SBUS (serial bus) and has an output QH that is connected to the serial data input of U101. Together U102 (LSBs) and U101 (MSBs) provide a 16-bit input to DAC U103. The output of DAC 103 represents a programmed bias potential.

2. BOOTSTRAPPED POWER SUPPLY CIRCUITRY WITH OVERLOAD PROTECTION

Amplifier U105 boosts the filtered DAC voltage to generate a bias signal in the range of ±16 VDC. A dual power supply (VR101 and VR102) that tracks (or is bootstrapped to) the bias signal voltage powers further circuitry that buffers and switches the bias signal.

Buffer U108 and regulators VR101 and VR102 together generate a supply voltage that is respectively 7 V above (REGHI_1) and 7 V below (REGLO_1) the digitally programmed bias voltage. The digitally programmed bias voltage from the DAC U103 is amplified and filtered at U105 and is further processed through U106, U107 and U108, as described below, before being applied to the adjustment (ADJ) terminals of VR101 and VR102. This approach allows for the use of precision low voltage components over a wide operating range and, as a result, component size and power dissipation are greatly reduced.

One potential limitation of this approach is a difficulty in avoiding damage to the circuitry or the unit under test. Rapid step changes or circuit overloads can drag the input or output circuitry beyond its internal supply voltage, potentially causing damage.

To avoid this condition a unique circuit topology implements a simple and effective protection mechanism. In greater detail, overloads cause power buffer U107 to go into saturation due to the induced voltage drop across R109 (or R110) and R111. This causes the output voltage at node VBIAS_1 (J23) to shift toward the overload potential. The output shift is followed by buffer U108 which shifts the adjustment terminals of the regulators VR101 and VR102 accordingly in order to keep all circuitry within the desired operational range.

Under these conditions the saturated U107 stage has a fixed voltage drop of approximately 2 V. The bootstrapped supply maintains a fixed voltage across what is now a fixed resistance composed of R109 (or R110) and R111. This constant voltage across a constant resistance thus maintains a constant current that is overload limited to, by example, ±50 mA. Overloads may occur to any potential within the bootstrap operating range of ±16 V without damage.

It is noted that overload conditions and rapid voltage changes may cause the input to U106 to exceed its voltage range. If this occurs the internal diodes of U106 are caused to conduct across the + and − input nodes of U106.

A resultant voltage developed across R108 then causes a diode to conduct within CR101, and subsequently clamps the voltage developed at the + input node of U106 to within 1.6 V of VBIAS_1. Any remaining fault voltage harmlessly develops across R106. This action maintains proper signal levels at the input to U106 in order to avoid the occurrence of phase reversals or oscillations. Normal operation is restored when the overload condition is removed.

3. INTEGRATING CLOCK DRIVER PROVIDING CONTROLLED SLEW RATE AND DC ACCURACY (FIG. 3)

Figure 3:
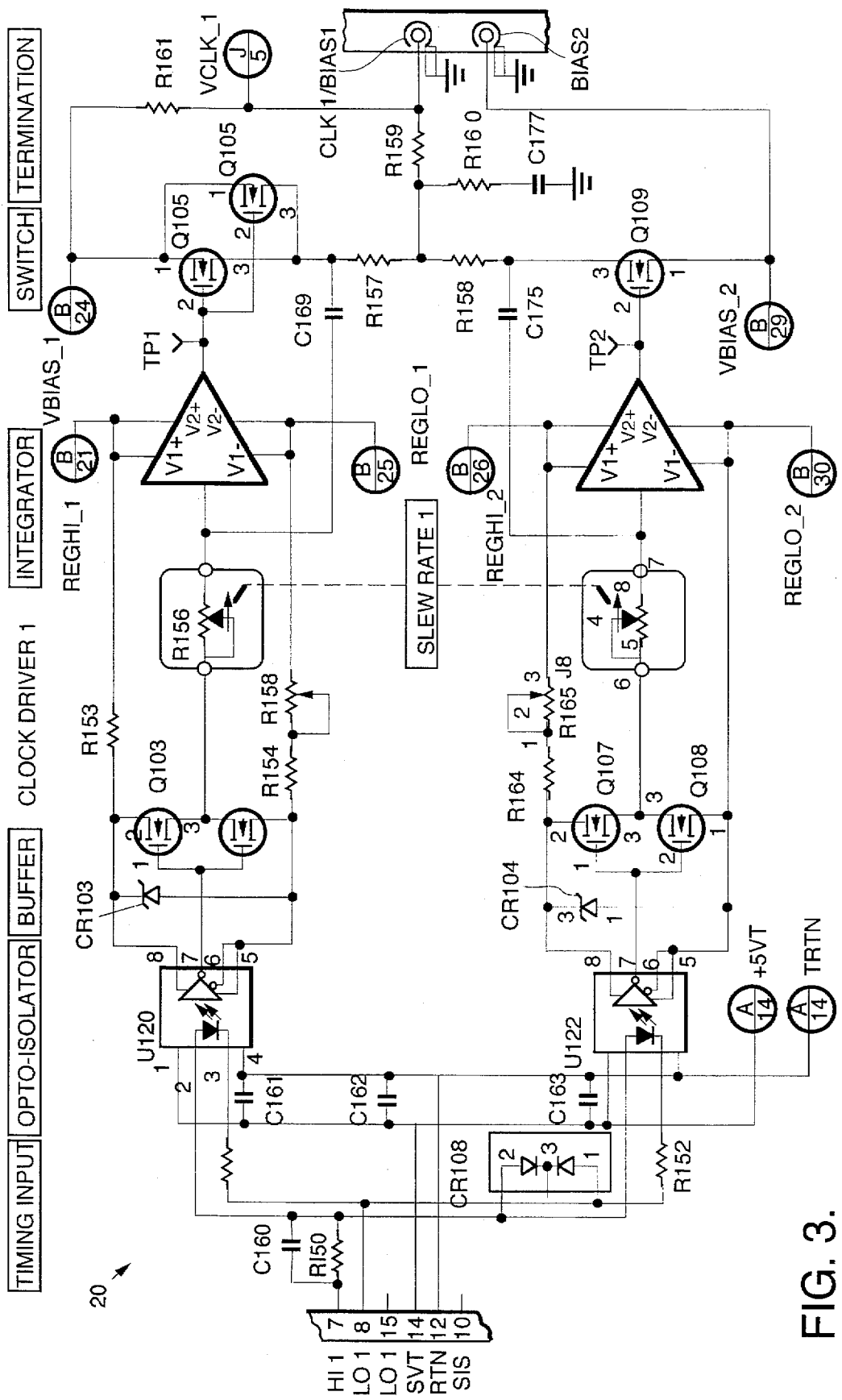

FIG. 3 illustrates a clock driver circuit 20 comprised of a timing input section, an opto-isolator section, a buffer, an integrator, a switch and a termination. The clock driver circuit 20 switches between the two bias voltages VBIAS_1 and VBIAS_2 output from U107 and U117 (FIGS. 2B and 2D), respectively, under the command of an external timing signal. The clock driver circuit 20 generates an output clock signal waveform with programmable high and low rail voltages. The output clock frequency may vary from DC to, by example, 10 MHz. Switching transistors Q105 and Q109 alternately apply VBIAS_1 and VBIAS_2 to the output connector J2 pin 1. The MOSFET devices that implement Q105 and Q109 beneficially maintain the DC accuracy and low noise of the bias supplies of FIGS. 2A–2D.

The use of the bootstrapped supplies (i.e., REGHI_1, REGLO_1 (FIGS. 2A and 2B), REGHI_2 and REGLO_2 (FIGS. 2C and 2D)) described previously maintains a constant and safe voltage relationship from gate to source of the transistors Q105 and Q109 regardless of the magnitude of the bias voltages VBIAS_1 and VBIAS_2. The fixed voltages also reduce gate drive complexity.

Optical isolation is preferred on the clock timing input signal lines (TH1, TL1) in order to break ground loops between the digital and analog systems, and also to prevent conducted interference from entering the low noise environment of the unit under test. Two optical isolators U120 and U122 further separate the two bootstrap supplies for VIAS_1 and VBIAS_2. The clock timing signal lines are supplied from a programmable multi-channel timing generator 15, as shown in the block diagram of FIG. 6. One important feature of this circuit is the integrating action that takes place during the transition between VBIAS_1 and VBIAS_2. Referring to the upper signal channel only for now, the timing signals applied through the opto-isolator U120 cause one of transistors Q103 and Q104 to switch between a level set by zener diode CR103 (e.g., 5 V). The resulting 5 V swing drives U121 through a dual-trimpot R156 (or through the circuitry described in the following section and illustrated in FIG. 4). U121 buffers this voltage to drive the gate terminal of Q105. The gate voltage continues to change until the Q105 gate threshold level of approximately 2 V is reached. At this point Q105 changes its conduction to cause a rapid change in voltage at the clock output of J2 pin 1. The voltage swing at the output of Q105 is coupled to the input of U121 through capacitor C169 in the form of negative feedback. This action causes the voltage swing at the input to U121 to virtually stop, and thus creates a fixed voltage drop across trimpot R156. This fixed voltage drop in turn causes a fixed current to flow through the feedback capacitance C169. A constant current flow through a fixed capacitance causes a constant slew rate to occur at the clock output, until the transistors Q105 and Q109 either saturate or pinch off. The voltage at the input to U121 then completes its 5 V swing to further enhance or deplete the gate of Q105.

It should be appreciated that buffer U121 does not go into saturation and, as a result, does not suffer from long saturation recovery times.

A one time adjustment of gate balance trimmer R155 (and R165) corrects for component variations in gate threshold voltage for Q105 (and Q109). This adjustment also centers the threshold voltage within the 5 V timing swing.

Transistors Q105 and Q109 form a push-pull class $AB_2$ output stage while slewing to generate the proper waveform regardless of load. Once saturated these transistors are virtually transparent to the bias output.

4. ACTIVE CURRENT STEERING BRIDGE FOR CONTROLLING SLEW RATE (FIG. 4)

Figure 4:
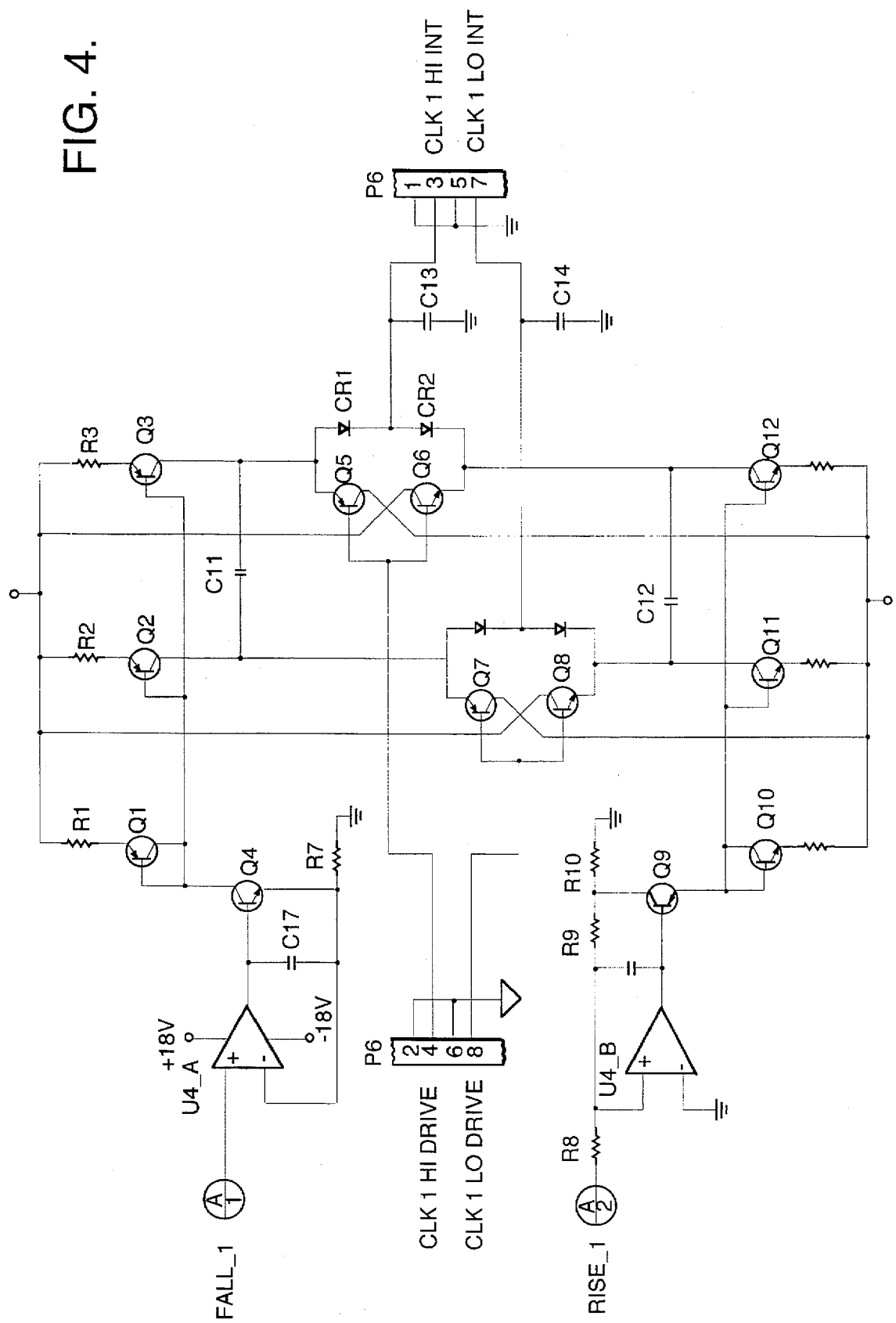
Figure 6:
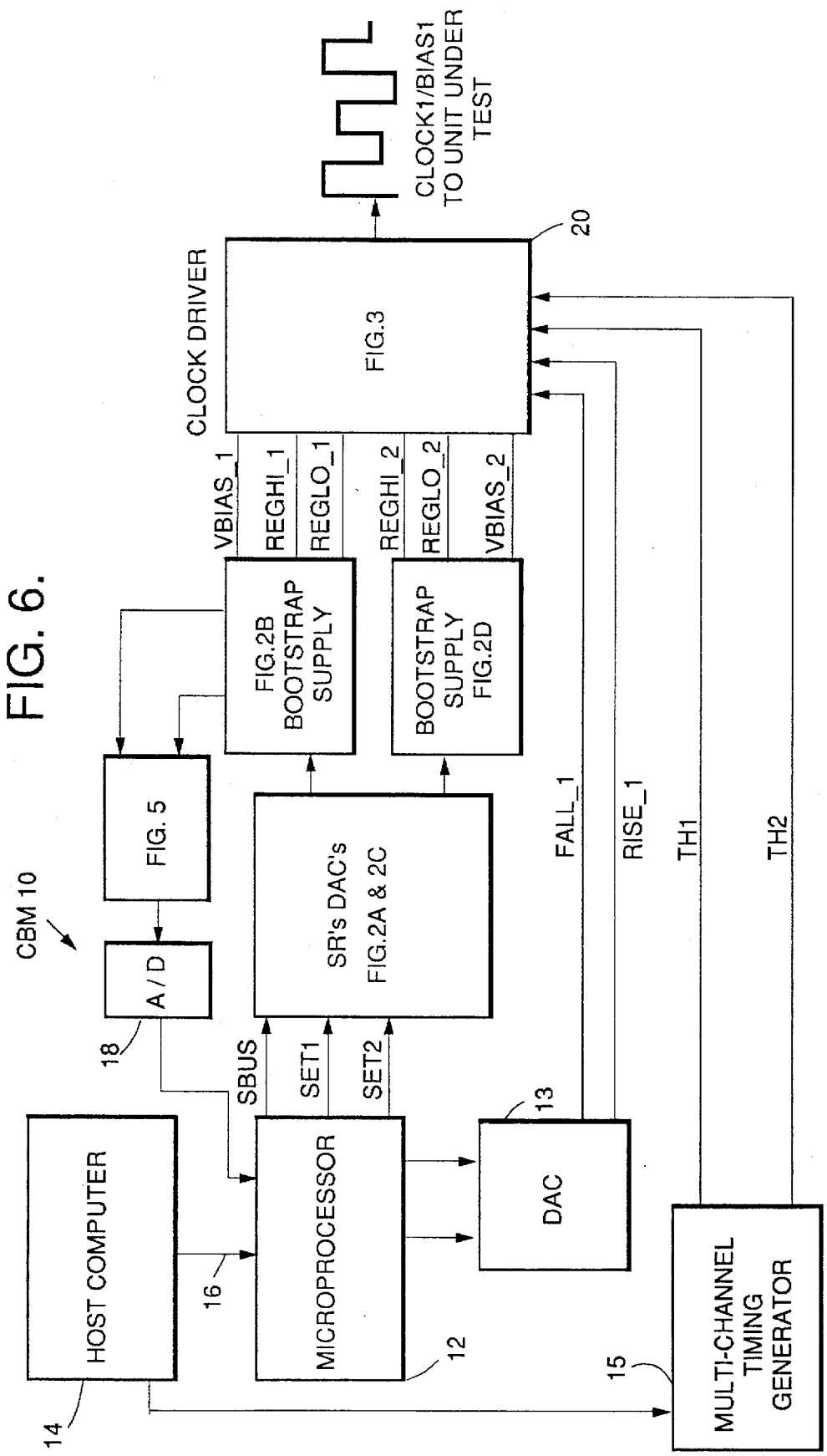
FIG. 6 is a block diagram showing an embedded microprocessor of the clock and bias module interconnected with a host computer.

FIG. 4 illustrates a further embodiment of a clock driver wherein the slew rate may be programmed digitally from the host computer 14, via the on-board (local) microprocessor 12 (FIG. 6). This circuitry also allows clock signal waveform rising rates and clock signal waveform falling rates to be set differently. In this embodiment the circuitry connected between connector P6 pins 4 and 3 and P6 pins 8 and 7 replaces the dual trim-pot R156 of FIG. 3.

In operation the on-board microprocessor 12 programs a voltage output from a DAC 13 (FIG. 6) to be in the range of +100 mV to +10 V. The output of the DAC 13 is the voltage FALL__1. Operational amplifier U4A and transistor Q4 (FIG. 4) form a voltage to current converter. The programmed voltage (+100 mV to +10 V) of FALL__1 is converted to a current of +120 µA to +12 mA that flows through Q1 and R1. Transistors Q1, Q2 and Q3 form positive current mirrors, and Q2 and Q3 generate matching currents through R2 and R3, respectively. A second DAC (shown also as 13 in FIG. 6) generates the signal RISE__1 which is applied to U4B and Q9. This results in negative currents through R5 and R6, via U4B, Q9 and Q10, and yields output currents in the range of −120 µA to −12 mA. These current mirrors provide a wide compliance voltage range of ±22 V capable of driving the clock circuitry that is riding on the bootstrapped power supplies.

An important aspect of this embodiment of the invention is referred to herein as an Active Current-Steering Bridge (ACSB). Transistors Q5 and Q6, in conjunction with diodes CR1 and CR2, form a bridge circuit to direct the flow of current from the positive and negative current mirrors (Q3/Q12) into the high rail integrator (U121, FIG. 3) at P6 pin 3. A second ACSB comprised of Q7, Q8, CR3, and CR4 directs a flow of current from positive and negative current mirrors (Q2/Q11) to the low rail integrator (U123, FIG. 3) at P6 pin 7.

Timing signals CLK 1 HI DRIVE (output from Q103 and Q104 of FIG. 3) and CLK 1 LO DRIVE (output from Q107 and Q108 of FIG. 3) are input to this circuit through P6, pins 4 and 8 respectively. Due in part to the opto-isolators U120 and U122 the 5 V swing of these signals may be floating anywhere in the range of +20 V to −20 V, depending on the clock rail settings. Each ACSB operates to direct the proper current to the clock integration circuits, only while integrating, and at the proper voltage level and at rates up to 10 MHz (in the presently preferred embodiment of this invention).

In the case of a rising timing signal, Q5 becomes reverse biased and Q6 acts as a voltage follower to cause the cathode of CR2 to rise to 0.6 V below the timing signal level. This action causes CR1 to conduct and to direct the current from Q3 to the integrator U121 (FIG. 3). The voltage level at P6 pin 3 then rises, pauses during integration, and then continues to rise until CR2 conducts. The voltage is then held by CR2, or if need be CR1, until the timing signal changes again. The positive current from Q3 to the integrator U121 controls the falling edge slew rate of the clock output signal. The rising edge slew rate is similarly controlled by Q7, Q8, CR3 and CR4, in conjunction with integrator U123 of FIG. 3.

The output voltage of this circuit is held within 0.2 V of an idle timing voltage due to the cancellation of the voltage drops across Q6 and CR2, and across Q5 and CR1. These diodes are preferably Schottky Barrier types that provide high speed and a slightly lower forward voltage drop than the $V_{BE(sat)}$ voltage of the transistors. This allows current to flow directly between Q3 and Q12 in order to minimize power dissipation while idling. Should the current sources be set differently from each other then excess current from Q12 will pass through Q6 to the positive supply, or excess current from Q3 will pass through Q5 to the negative supply.

It should be realized that a correct current is flowing at all times without loading the timing signal or dissipating excessive power. The timing signals function to direct the flow of current to the proper points. When the timing signal falls, Q6 is reverse biased and Q5 follows the signal. CR2 conducts and the negative current from Q12 flows to the integrator U121 and controls the rising edge slew rate of the clock. The second ACSB (Q7, Q8, CR3, CR4) performs identical functions for the low rail integrator U123 of FIG. 3. Capacitors C11 and C12 ensure that the high and low integrator voltages track each other regardless of any circuit loading variations.

It should be noted that the internal emitter-to-base capacitance $C_{eb}$ of Q5 and Q6 couples an additional charge to the input of integrator U121. This charge is absorbed by stray circuit board capacitance and C13. A proper selection of C13 assures that the charge is dissipated while the integrator voltage is rising and before integration begins. This effect reduces the propagation delay from a timing pulse edge to the beginning of clock integration and slewing. Capacitor C14 performs the same function for the low rail integrator U123. By example, with 24pF of feedback capacitance in the integrators U121 and U123, slew rates of between 5 V/µs to 500 V/µs may be set.

5. Average Load Current Measurement From DC To 10 MHz.

Figure 1:
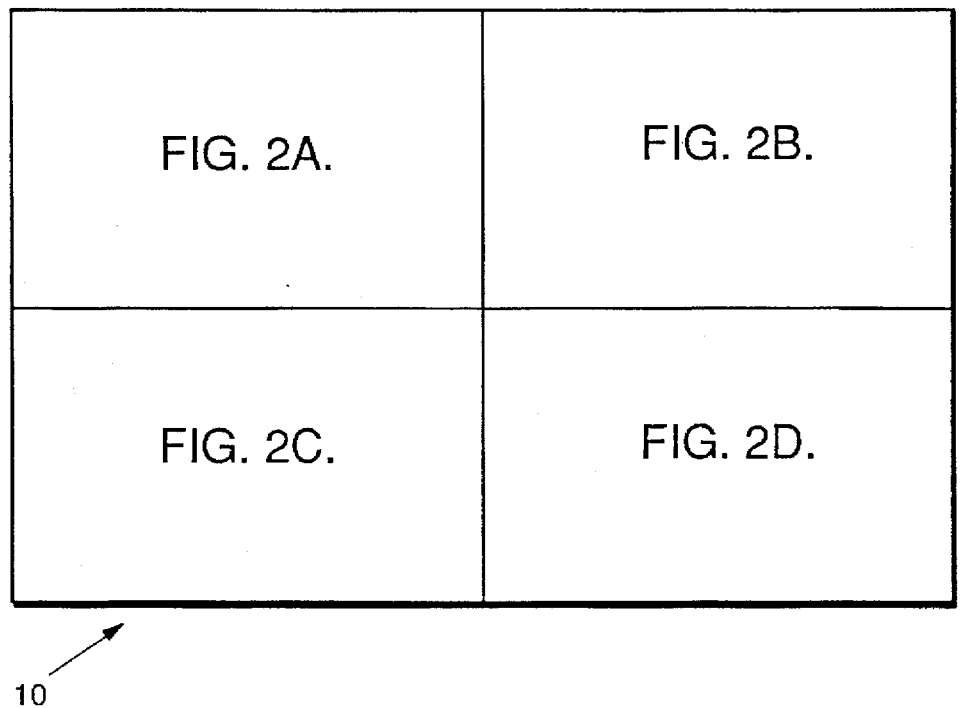
FIG. 1 depicts the relative positions of FIGS. 2A–2D with respect to one another.
Figure 5:
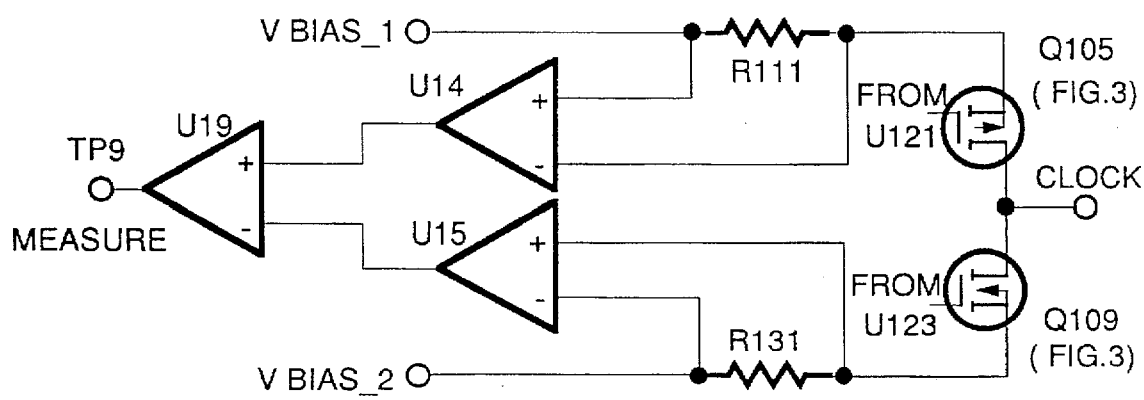
FIG. 5 is a simplified schematic diagram of a current measurement circuit that forms a portion of FIGS. 2B and 2D.

It is important to measure the load current of the unit under test to determine the proper operation of the unit. However, determining a small voltage drop across a current sensing resistor, while the common mode voltage may be swinging ±15 V at 10 MHz, requires extremely precise capacitive balancing of the measurement circuit. This is generally not a practical approach in a multi-channel instrument. FIG. 5 illustrates a simplified version of the current-measurement circuit of this invention.

Differential amplifiers U14 and U15 measure the voltage drop induced across R111 (FIG. 2B) and R131 (FIG. 2D), respectively. Large clock voltage swings are not seen at these points. The common mode voltage is the DC bias value plus the small changes due to load current. DC common mode rejection (CMR) is optimized by trimming resistors. Combining the outputs of the amplifiers U14 and U15 with differential amplifier U19 yields a composite current representative of that flowing to the clock output at J2 pin 1 (see FIG. 3).

This circuit configuration indicates a positive current for a current flowing from VBias__1 to the clock load or from VBias__2 to the clock load. A negative current is indicated for that flowing from the Clock load into VBias__1 or VBias__2. In addition, differential amplifier U19 cancels any crossover current that may exist between VBias__1 and VBias__2 while Q105 and Q109 are slewing between rails. This is due to the fact that crossover current will induce equal-magnitude but opposite-polarity voltages across R111 and R131.

The composite current signal that is output from U19 is subsequently filtered and then digitized by an AD converter circuit 18 (FIG. 6), enabling this current to be measured by the on-board (local) microprocessor 12.

A multiplexing signal selector circuit (not shown) enables the AD converter 18 to measure the load voltage or current on any channel, and to also measure the internal temperature of the CBM 10. In this regard one or more semiconductor-type sensors are employed to convert circuit board temperature to a voltage that can be digitized by the AD converter 18.

In view of the foregoing description it may be realized that the majority of power dissipation occurs within the bootstrapped regulators (VR101, VR102, VR103, VR104), which enables the remaining circuits to use low-power surface-mount devices. The overall compact design allows for short, low capacitance cabling to the unit under test, and further provides for high quality single point grounding techniques. A multi-layer printed circuit board forms an integral part of the overall circuitry and implementation by providing a low noise and compact environment for the circuitry of the CBM 10.

FIG. 6 is a simplified block diagram of the CBM 10 and shows the local microprocessor 12, host computer 14, and the fiber optic link 16 that bidirectionally connects the host computer 14 to the microprocessor 12. Commands to the microprocessor 12 (such as desired clock waveform rising and falling slew rates) are passed through the link 16, and measurement results are passed back through the link 16 to the host computer 14. The output of the measurement block of FIG. 5 is shown connected to the above-mentioned analog to digital (AD) converter 18. The microprocessor 12 sets the CBM circuit configuration as desired (i.e., programs the various DACs, etc.) and is then shut down (put in a quiescent state) by the host computer 14 in order to terminate all digital activity and related noise. The host computer 14 also programs (e.g., frequency and duty cycle) the timing generator 15 to output desired clock waveforms to opto-isolators U120 and U122 of the clock driver 20 (FIG. 3).

Figure 7A:
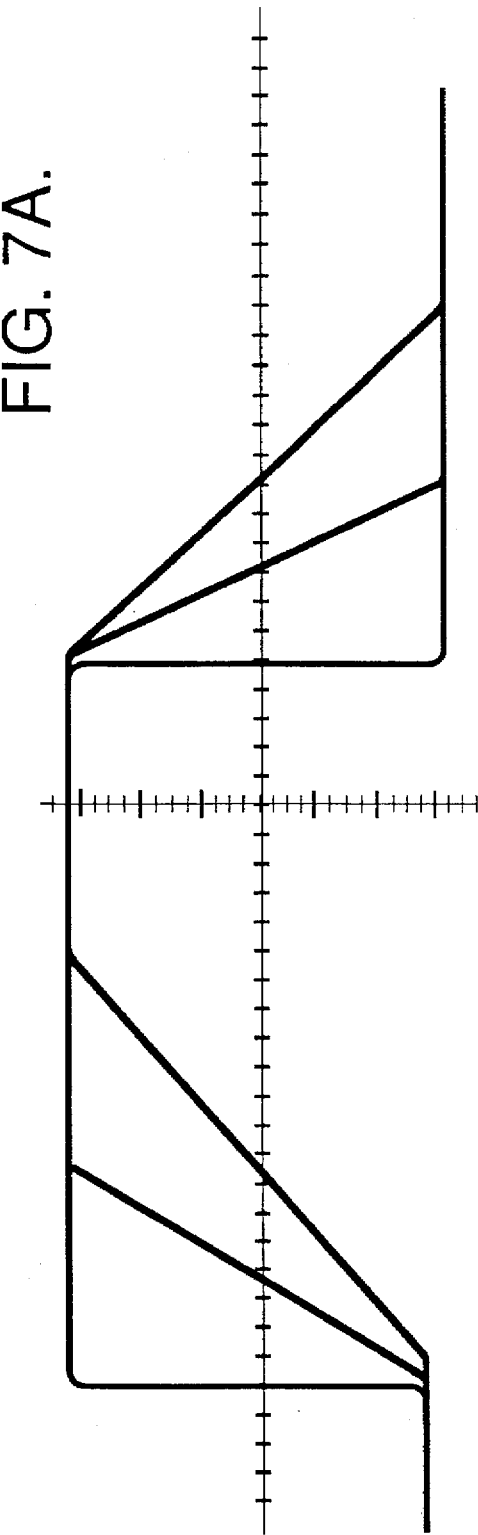
FIGS. 7A and 7B illustrate exemplary clock waveforms generated by the CBM.
Figure 7B:
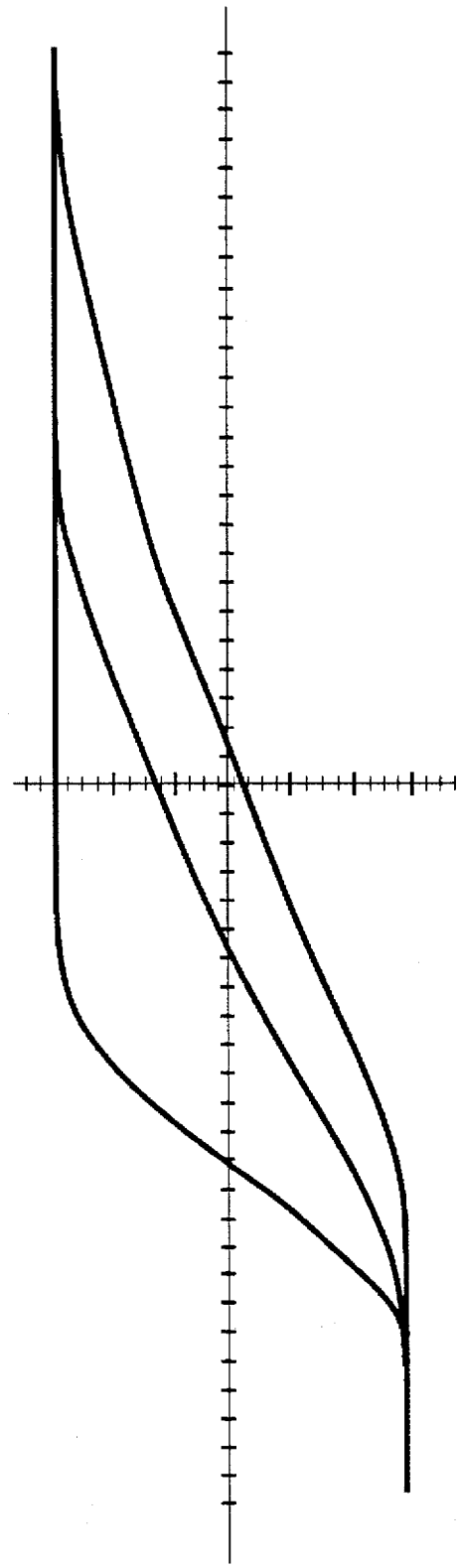

FIGS. 7A and 7B are exemplary clock waveforms that are output from the CBM 10. FIG. 7A illustrates several superimposed clock waveforms with various slew rates in the range of 5 to 500 V/microsecond (horizontal timebase equals 2 microseconds/division). The vertical scale is calibrated in 5 volts per major division. FIG. 7B illustrates several superimposed clock waveforms with various slew rates in the range of 200 to 500 V/microsecond (horizontal timebase equals 20 nanoseconds/division). The vertical scale is calibrated in 0.5 volts per major division.

Although described in the context of specific component types, voltage ranges, frequency ranges, slew rates and the like, it should be understood that these and other values are meant to be illustrative of presently preferred embodiments of this invention, and are not intended to be construed in a limiting sense upon the scope or practice of this invention.

Thus, while the invention has been particularly shown and described with respect to preferred embodiments thereof, it will be understood by those skilled in the art that changes in form and details may be made therein without departing from the scope and spirit of the invention.

What is claimed is:

1. A circuit for generating clocking signals, comprising:
a local controller having digital outputs;
first and second digital to analog converters having inputs coupled to said digital outputs for outputting first and second programmed bias potentials, respectively;
a circuit for filtering and buffering said first and second programmed bias potentials to generate first and second buffered bias potentials;
first and second dual rail voltage regulators each of which is coupled to one of said buffered bias potentials for having regulated bipolar output voltages that vary in magnitude as a function of a magnitude of said buffered bias potential;
a programmable slew rate generator powered by said regulated bipolar output voltages and having inputs coupled to first clock signals and control inputs responsive to said local controller for controlling rise and fall times of second clock signals output from said programmable slew rate generator; and switching circuitry having inputs coupled to said second clock signals output from said programmable slew rate generator and to said buffered bias potentials for generating an output clock signal that swings between said buffered bias potentials with controlled rise and fall times.

2. A circuit as set forth in claim 1 wherein said filtering and buffering circuit is comprised of a filter means having selectable first and second time constants, and wherein a first, shorter time constant is automatically selected when said inputs are changed for programming new bias potentials.

3. A circuit as set forth in claim 1 wherein said filtering and buffering circuit is comprised of overload protection means for maintaining said regulated bipolar output voltages within a predetermined operational range in the presence of an overload condition.

4. A circuit as set forth in claim 1 wherein said inputs of said programmable slew rate generator are optically coupled to said first clock signals.

5. A circuit as set forth in claim 1 wherein said programmable slew rate generator is comprised of first and second integrators for integrating said first clock signals with programmable integration periods for separately controlling rising and falling slew rates of said second clock signal.

6. A circuit as set forth in claim 5 wherein said integration periods are programmed by analog voltages generated by said local controller in conjunction with digital to analog converter means.

7. A circuit as set forth in claim 5 wherein each of said first and second integrators includes an amplifier having a feedback capacitance connected between an input node and an output node and a current source means connected to said input node.

8. A circuit as set forth in claim 7 wherein each of said current source means is comprised of first and second programmable current mirrors and a switching circuit responsive to said first clock signal for selectively switching outputs of said first and second programmable current mirrors to said input node.

9. A system for applying stimulus signals to an array of radiation detectors, comprising:
a local controller, said local controller having digital outputs including a bit serial bus;
a host controller that is bidirectionally coupled to said local controller;
first and second digital to analog converters having inputs coupled to outputs of first and second shift registers, respectively, said first and second shift registers each having a serial input coupled to said bit serial bus, said first and second digital to analog converters outputting first and second programmed bias potentials, respectively;
a circuit for filtering and buffering said first and second programmed bias potentials to generate first and second buffered bias potentials;
first and second dual rail voltage regulators each of which is coupled to one of said buffered bias potentials for having regulated bipolar output voltages that are bootstrapped to said coupled one of said buffered bias potentials;
a programmable slew rate generator powered by said regulated bipolar output voltages and having inputs coupled to first clock signals and control inputs responsive to said local controller for controlling rise and fall times of second clock signals output from said programmable slew rate generator; and switching circuitry having inputs coupled to said second clock signals output from said programmable slew rate generator and to said buffered bias potentials for generating an output clock signal that swings between said buffered bias potentials with controlled rise and fall times, said output clock signal for coupling to an array of radiation detectors.

10. A system as set forth in claim 9 wherein said filtering and buffering circuit is comprised of a filter means having selectable first and second time constants, and wherein a first, shorter time constant is automatically selected when said inputs are changed for programming a new bias potential.

11. A system as set forth in claim 9 wherein said filtering and buffering circuit is comprised of overload protection means for maintaining said regulated bipolar output voltages within an operational range in the presence of an overload condition.

12. A system as set forth in claim 9 wherein said inputs of said programmable slew rate generator are optically coupled to said first clock signals, and wherein said host controller is optically coupled to said local controller for transmitting commands to said local controller and for receiving measurement results from said local controller.

13. A system as set forth in claim 9 wherein said programmable slew rate generator is comprised of first and second integrators for integrating said first clock signals with programmable integration periods for separately controlling rising and falling slew rates of said second clock signal.

14. A system as set forth in claim 13 wherein said integration periods are programmed by analog voltages generated by said local controller in conjunction with digital to analog converter means.

15. A system as set forth in claim 13 wherein each of said first and second integrators includes an amplifier having a feedback capacitance connected between an input node and an output node and a current source means connected to said input node.

16. A system as set forth in claim 15 wherein each of said current source means is comprised of first and second programmable current mirrors and a switching circuit responsive to said first clock signal for selectively switching outputs of said first and second programmable current mirrors to said input node.

17. A system as set forth in claim 9 wherein said local controller is responsive to said host controller for being placed in a quiescent state during a time that an array of radiation detectors is being stimulated by said second clock signal.

18. A system as set forth in claim 9 and further comprising a measurement circuit for measuring a load current characteristic of said second clock signal, said measurement circuit having an output coupled to said local controller.

19. A clock generator, comprising a programmable slew rate generator having clock inputs coupled to first clock signals and first and second control signals for controlling rise and fall times, respectively, of second clock signals output from said programmable slew rate generator, said programmable slew rate generator being comprised of first and second integrators for integrating said first clock signals with programmable integration periods for separately controlling rising and falling slew rates of said second clock signals, each of said first and second integrators including an amplifier having a feedback capacitance connected between an input node and an output node and a current source means connected to said input node, each of said current source means being comprised of first and second programmable current mirrors and a switching circuit responsive to said first clock signal for selectively switching outputs of said first and second programmable current mirrors to said input node; wherein said integration periods are programmed by first and second analog voltages that are coupled to said first and second control inputs.

* * * * *